United States Patent [19]

McMullan, Jr. et al.

[11] Patent Number: 5,271,011

[45] Date of Patent: Dec. 14, 1993

[54] DIGITAL AUDIO DATA MUTING SYSTEM AND METHOD

[75] Inventors: Jay C. McMullan, Jr., Doraville; Lee R. Johnson, Lawrenceville, both of Ga.

[73] Assignee: Scientific-Atlanta, Inc., Norcross, Ga.

[21] Appl. No.: 852,283

[22] Filed: Mar. 16, 1992

[51] Int. Cl.$^5$ .................................................. H04L 1/20
[52] U.S. Cl. .......................................... 371/5.3; 371/5.5
[58] Field of Search ......................... 371/5.1, 5.3, 5.5; 370/17; 375/10, 58

[56] References Cited

U.S. PATENT DOCUMENTS

| | | | |
|---|---|---|---|
| 3,824,548 | 7/1974 | Sullivan et al. | 371/5.3 |
| 4,312,070 | 1/1982 | Coombes et al. | 371/40 |
| 4,330,885 | 5/1982 | Abbott et al. | 370/17 |
| 4,363,123 | 12/1982 | Grover | 371/5.3 X |
| 4,433,415 | 2/1984 | Kojima | 371/37 |
| 4,593,392 | 6/1986 | Kouyama | 371/31 |
| 4,608,455 | 8/1986 | McNair | 178/22.17 |
| 4,688,224 | 8/1987 | Dal Degan et al. | 371/31 |
| 4,730,313 | 3/1988 | Stephenson et al. | 371/5.5 |
| 4,802,171 | 1/1989 | Rasky | 371/43 |
| 4,809,093 | 2/1989 | Hamabe et al. | 360/67 |
| 4,864,573 | 9/1989 | Horsten | 371/5.1 |
| 4,922,537 | 5/1990 | Frederiksen | 381/31 |
| 4,962,494 | 10/1990 | Kimura | 369/48 |

*Primary Examiner*—Stephen M. Baker
*Attorney, Agent, or Firm*—William A. Marvin; Frederick W. Powers, III

[57] ABSTRACT

A system and method for disabling the output of a data transmission system when a relatively high error rate is detected in the transmitted signal. The error muting technique of the invention functions as the digital equivalent of a leaky integrator with hysteresis. In particular, the signal quality of the received data transmission is monitored, and a predetermined value is added to an accumulator or error counter when an error is detected. This value varies depending upon the nature of the detected error such that more serious errors are given greater error values. The error counter is also decremented by one or some other amount at a programmable time interval in accordance with the maximum acceptable error rate. The error count (accumulator sum) is continuously compared to a programmable error threshold, and if the threshold is exceeded, the output of the data transmission system is disabled, or in the case of a digital audio transmission system, is muted. Once disabled or muted, the output is not reenabled or unmuted until the error counter is decremented all the way down to a lower limit such as zero. In a particular embodiment of the invention, the error counter is decremented at a different rate when the output of the data transmission system has been disabled or muted so that the system may be more or less rapidly returned to normal operation.

42 Claims, 4 Drawing Sheets

DIGITAL AUDIO DATA MUTING SYSTEM AND METHOD

BACKGROUND OF THE INVENTION

1. Field of the Invention

The present invention relates to an error detection system having a programmable error sensitivity, and more particularly, to a digital audio data muting circuit which mutes a digital audio output of a receiver in a digital audio transmission system when a large number of errors per unit time are detected in the received digital audio signal.

2. Description of the Prior Art

Numerous processing systems are known for detecting and/or correcting errors in a received pulse code modulated signal in a communications system. Typically, when a small number of errors are detected in the received signal, means are provided for correcting the detected errors before the received signal is further processed. However, when such systems detect a large number of errors in the received signal which cannot be corrected by the available error correction circuits, the receiver output is typically disabled or, in the case of a digital audio transmission system, muted until such time as acceptable (i.e., relatively error free) data transmission is restored.

An example of a system of the type just described is disclosed by Horsten in U.S. Pat. No. 4,864,573. Horsten therein describes a muting circuit for a compact disc digital audio system having error correction means for correcting errors in data words forming the pulse code modulated signal. In that system, when the error correction means cannot correct all of the errors in the pulse code modulated signal, error flags are produced on an output and applied to a control unit which derives from these flags a control signal for switching on a muting unit when a predetermined number of flags has been received. As a result, the digital audio output of the compact disc system is muted when a large number of errors (flags) are detected.

The muting unit in the Horsten apparatus is not switched on until there are definitely errors in the samples, and the muting unit is not switched off until there are only a few errors left and the signal is again of more or less hi-fi quality. Unfortunately, Horsten does not distinguish different types of transmission errors, and accordingly, the digital audio output is not muted until the requisite number of flags are detected in a predetermined time interval. As a result, the digital audio output received by the listener may be perceptibly degraded before the output is completely muted. A more robust muting system is desired which further discriminates amongst different types of transmission errors so that the data muting may occur sooner when more serious errors are detected, thereby preventing the listener from perceiving a degradation of the digital audio signal before the digital audio receiver is muted.

Other techniques are known for muting digital audio outputs when errors in the received signal are detected. For Example, Kouyama in U.S. Pat. No. 4,593,392 mutes the output of a digital tape recording/reproducing apparatus when an error is detected in the received signal. Complementary gain control circuits are used by Kouyama to gradually fade in a newly selected signal (which may be, e.g., a previous value of the received signal or a muting signal) while gradually fading out the previously selected signal, allegedly eliminating undesirable clicking noises.

Similar systems for muting digital audio outputs when errors are detected in the received data include U.S. Pat. No. 4,433,415 to Kojima and U.S. Pat. No. 4,962,494 to Kimura. Kojima discloses a system in which the digital audio output is muted when an input memory buffer overflows, while Kimura discloses a volume control circuit in which the output is muted "according to necessity."

Muting has also been used in speech transmission systems when data errors are detected in the received signals. Such techniques are described by way of example by Coombes et al. in U.S. Pat. No. 4,312,070; McNair in U.S. Pat. No. 4,608,455; Dal Degan et al. in U.S. Pat. No. 4,688,224; and Rasky in U.S. Pat. No. 4,802,171. However, as with the digital audio data processing systems, such speech transmission systems do not provide a robust muting system which discriminates amongst different types of transmission errors so that the data muting may occur sooner when more serious errors are detected so as to prevent the listener from perceiving a degradation of the digital audio signal before or after the output is muted.

A digital audio data transmission system has been developed by the assignees of the present invention which permits the transmission of digital audio signals over a satellite transmission network and then distribution of the digital audio signals over local cable television channels for reception by a subscriber. Such a system is described, for example, in U.S. patent application Ser. No. 07/618,744, filed Nov. 27, 1990. As described therein, digital audio signals from a plurality of compact disc players are encoded and transmitted over the satellite transmission network and retransmitted over a local cable distribution system for reception by a digital music terminal in the homes of the respective subscribers. Such a system provides high quality digital audio signals to the subscribers without the interruption or noise which is prevalent in common AM and FM audio signal transmission systems.

However, under certain circumstances, such as an interruption in the satellite transmission, it is desirable that the digital audio output be muted to prevent perceptible degradations of the received audio signal. Although error detection and correction systems are provided in this system to correct or cover up less serious errors so that the listener does not perceive the data errors, under certain circumstances more errors are detected than can be corrected by the error correction circuitry. Under these conditions, it is desired that the digital audio output be muted until the signal quality returns to an acceptable level. Since not all data transmission errors cause the same degree of perceptible degradation in the received digital audio signal, it is also desired that different type of transmission errors be discriminated so that the digital audio output may be muted sooner when errors more perceptible to the listener are detected. The present has been designed to meet these needs.

SUMMARY OF THE INVENTION

The present invention solves the aforementioned problems in the prior art by providing an error muting system which may be used in conjunction with standard error detection and correction in digital audio, video, speech or other types of digital signal transmission systems. The present invention incorporates variable threshold error muting circuitry into the digital signal receiver which allows predictable error muting or system shut down when the received digital signal has numerous data errors which cannot be corrected by the error correction circuitry of the receiver. Although the invention is described herein with respect to a preferred embodiment in which the circuit of the invention is incorporated into a digital audio receiver terminal, those skilled in the art will appreciate that the invention also may be used in conjunction with any digital transmission format that detects transmission errors and performs error correction and/or concealment based on the error count. Other advantageous uses of the invention will become apparent to those skilled in the art from the following detailed description of the invention.

A data transmission system in accordance with a preferred embodiment of the invention has an error correction system with a programmable error sensitivity for detecting and correcting different types of transmission errors. Such an error correction system in accordance with the invention comprises means for generating first values representing different types of data transmission errors of the data transmission system, where greater values are assigned to more serious data transmission errors, means for generating second values, complementary to the first values, at a programmable rate which is proportional to a maximum acceptable data transmission error rate, and means for continuously summing the first and second values and, when the sum of the first and second values exceeds a first predetermined threshold value, disabling an output of the data transmission system until the sum of the first and second values falls below a second predetermined threshold value. In a preferred embodiment, the second predetermined threshold value is less than the first predetermined threshold value and may be zero.

In a preferred embodiment of the invention, the summing means comprises an up/down counter having an increment input which receives the first values and a decrement input which receives the second values. Preferably, the up/down counter does not increment above a predetermined upper limit which is greater than or equal to the first predetermined threshold value and does not decrement below the second predetermined threshold value so that the system may be more quickly disabled/enabled. On the other hand, the means for generating the first values preferably comprises respective data error detection circuits for correcting detected data transmission errors of the data transmission system.

Also, the means for generating the second values preferably comprises a frequency divider responsive to a fixed rate pulse stream F and a programmable register for storing a divisor value i. The programmable rate is then generated by the frequency divider by dividing the pulse stream F by the divisor value i. However, in a preferred embodiment of the invention, the means for generating the second values includes means for changing the programmable rate at which the second values are generated when the output of the data transmission system is disabled. This is accomplished in a preferred embodiment by adding an additional programmable register for storing a divisor value k and a switch for applying the divisor value k to the frequency divider when the output is disabled. In other words, the divisor value k is divided into the pulse stream F when the output of the data transmission system is disabled, thereby changing the resulting programmable rate so that the sum of the first and second values reaches the second predetermined threshold value at a different rate than when the frequency divider divides the pulse stream F by the divisor value i.

In a preferred embodiment, the summing means further comprises an error limit register for storing the first predetermined threshold value and a comparator for comparing a sum output of the up/down counter with the first predetermined threshold value from the error limit register and outputting a disable signal when the sum output of the up/down counter exceeds the first predetermined threshold value. Also, the data transmission system preferably transmits data in respective synchronized data frames for detection by a frame synchronous detector which determines whether the data transmitted by the data transmission system is frame synchronized and disables the decrement input of the up/down counter during time periods in which the data transmitted by the data transmission system has lost its frame synchronization. The increment input is also effectively disabled since data is not received at the terminal when frame synchronization is lost. As a result, the up/down counter is effectively disabled until frame synchronization is restored.

As noted above, the error detection and correction system of the invention is preferably implemented in a digital audio data transmission system. In such an arrangement, the digital audio data transmission system comprises an audio transmitter and a plurality of audio receivers, and each audio receiver has a muting system for muting its audio output in accordance with a programmable error sensitivity when errors in the received audio signal are detected. Such a muting system in accordance with the invention preferably comprises means for generating first values representing different types of data transmission errors of the digital audio transmission system, where greater values are assigned to more serious errors in the received audio signal, means for generating second values, complementary to the first values, at a programmable rate which is proportional to a maximum acceptable data transmission error rate, and means for continuously summing the first and second values and, when the sum of the first and second values exceeds a first predetermined threshold value, muting an output of the audio receiver until the sum of the first and second values falls below a second predetermined threshold value.

The scope of the invention also includes a method of selectively disabling a data transmission system in accordance with the number of received errors in the data transmission per unit time. Such a method in accordance with the invention preferably comprises the steps of:

generating first values representing different types of data transmission errors of the data transmission system, greater values being assigned to more serious data transmission errors;

generating second values, complementary to the first values, at a programmable rate which is proportional to a maximum acceptable number of received errors in the data transmission per unit time; and continuously summing the first and second values and, when the sum of the first and second values exceeds a first predetermined threshold value, disabling an output of the data transmission system until the sum of the first and second values falls below a second predetermined threshold value.

Such a method preferably comprises the further step of changing the programmable rate at which the second values are generated when the output of the data transmission system is disabled. Of course, the method of the invention may also be used in conjunction with a digital audio receiver of a digital audio data transmission system to mute the receiver's output in accordance with the number of received errors in the digital audio data transmission per unit time.

BRIEF DESCRIPTION OF THE DRAWINGS

The above-mentioned and other features and advantages of the present invention will be readily apparent to those of ordinary skill in the art in view of the accompanying drawings, of which.

DETAILED DESCRIPTION OF THE PRESENTLY PREFERRED EMBODIMENTS

Figure 1:
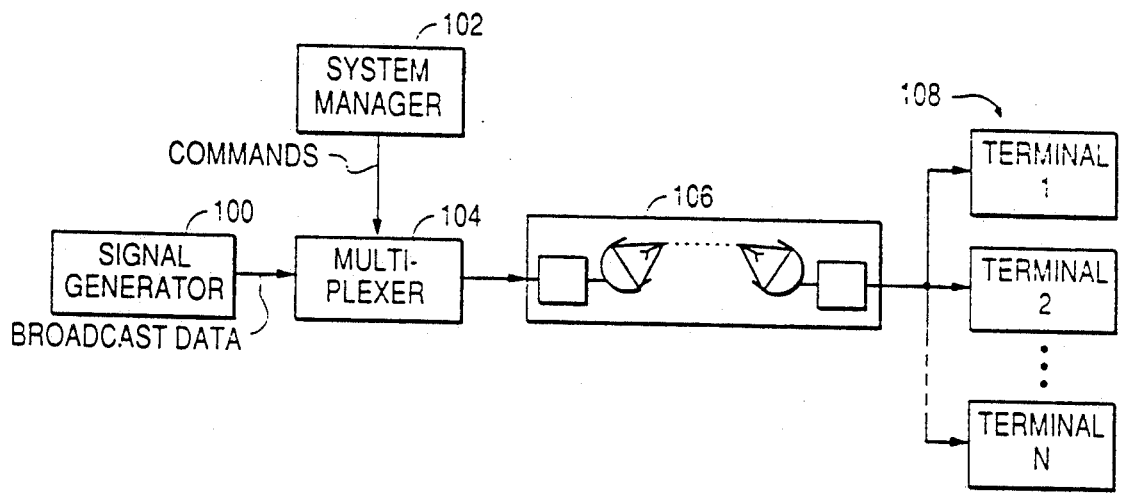
FIG. 1 illustrates a block diagram of a data transmission system embodying the present invention.

A system with the above-mentioned beneficial features in accordance with the presently preferred exemplary embodiments of the invention will now be described with reference to FIGS. 1-5. It will be appreciated by those of ordinary skill in the art that the description given herein is for exemplary purposes only and is not intended in any way to limit the scope of the invention. For example, although the present invention will be described in connection with the transmission of digital audio signals, those skilled in the art will appreciate that the technique of the invention may also be used in any data transmission system where the receivers detect transmission errors and perform error concealment based on an error count. For example, compact disc players, video tape recorders, digital television receivers, speech transmission systems or other modular communications systems are obvious environments for the present invention. However, those skilled in the art will appreciate that many other systems may incorporate the present invention as well. Accordingly, all questions regarding the scope of the invention should be resolved only by referring to the appended claims.

As noted above, the present invention is designed in its preferred embodiment for use in a digital music receiver terminal of the type described in the aforementioned U.S. patent application Ser. No. 07/618,744, filed Nov. 27, 1990, and assigned to the same assignee as the present invention. Preferably, such a digital music terminal has built-in error correction, detection and concealment such that under low data error conditions the built-in correction mechanism may correct any errors that occur during the transmission of the digital audio data. However, as the error level in the received data rises, the correction mechanism typically can no longer correct all the errors. However, these errors can still be detected. As a result, a concealment mechanism may be employed to minimize the noticeability of the errors in the received data. For example, the received data may be interpolated in an attempt to conceal missing data between respective points in the data transmission. When such error concealment takes place at low frequencies, the error concealment is generally unnoticeable. However, as the error level increases, the concealments happen more and more frequently, and if they become too frequent they add a noticeable distortion to the sound. Additionally, under severe error conditions, some errors cancel out in the error detector and pass through undetected. This also causes an audible degradation of the signal. Accordingly, the error detector preferably mutes the output of the digital audio receiver before the output distortion becomes noticeable; however, it should not mute the audio output too quickly since an occasional audible distortion is generally considered to be less objectionable than a completely muted output.

In order to address these problems, the present inventors have developed an error muting system which may be employed in systems such as the aforementioned digital music terminal. The error muting system in accordance with the invention can be generally described as the digital equivalent of a leaky integrator with hysteresis. In other words, in accordance with a preferred embodiment of the invention, the quality of the received signal is monitored by adding a predetermined value (depending upon the nature of the detected error) into an accumulator of an error counter. The accumulator of the error counter is also decremented by another predetermined value at programmable time intervals so that the value stored in the accumulator only builds when errors are received at a rate greater than the decrement rate. The error threshold is itself programmable such that if the error threshold is passed the output is muted. Once muted, the output is not unmuted until the accumulator of the error counter is decremented down to a lower threshold such as zero.

Different types of errors are given different weights by the error counter in accordance with the invention. For example, correctable errors are given a low weight, while uncorrectable errors are given a greater weight and hence add a greater value to the error count. This allows the error count to climb more rapidly towards the mute level in the presence of errors having a noticeable effect on the audio quality. As noted above, counteracting the effect of the detected errors in the error counter is a constant rate decrementer. In particular, after the reception of every N frames of digital audio data, the current value of the error counter is decremented. Once the error counter is decremented all the way to the lower threshold (zero), the output can be unmuted. As a result, a specific minimum ratio of good to bad frames may be required in accordance with the present invention before allowing the audio output to be unmuted. The size and rate of the received frames is important to determining the data error rate and the values of divisors i and k as will be described below with respect to FIGS. 4 and 5.

By using a variable weighting based on the different type of errors and constantly decrementing the error counter, the output may be prevented from muting due to transient errors common to cable distribution systems, while still preserving a fast muting function when the nature of the errors would cause the audio quality to become unacceptable. On the other hand, by requiring the error count to go all the way to zero before unmuting, intermittent muting action may be prevented whereby the output is muted until the signal quality has returned to acceptable levels.

The present invention will now be described in more detail with respect to FIGS. 1-5.

FIG. 1 illustrates a system block diagram of a data transmission system embodying the present invention. As illustrated, a data transmission system in accordance with the invention preferably includes a signal generator 100 for generating broadcast data which is combined with commands from a system manager 102 which provides subscriber control commands for combination with the broadcast data in a digital multiplexer 104. The combined digital data signals are then transmitted via a transmission and receiving system 106, and the received demodulated signals are then received at a plurality of receiver terminals 108. A preferred embodiment of such a data transmission system is described in the aforementioned U.S. patent application Ser. No. 07/618,744. As described therein, the signal generator 100 may comprise a plurality of compact disc players which provide output audio signals which are transmitted with their associated title, track and author information via a satellite transmission and cable distribution system to a plurality of digital audio music terminals connected at the receiver end of the cable distribution system. As described in that application, the transmitted digital audio signals are preferably transmitted in a compressed data format of the type described by Frederiksen in U.S. Pat. No. 4,922,537, the contents of which are incorporated herein by reference.

Figure 2:
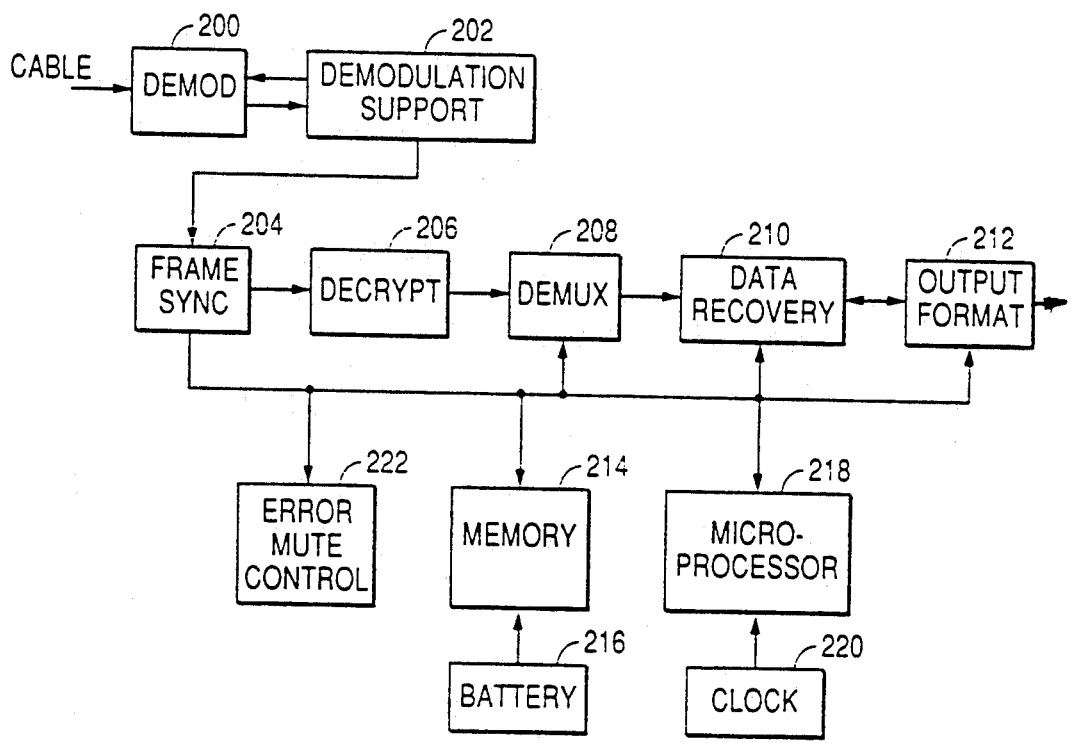
FIG. 2 illustrates a block diagram of a preferred embodiment of a terminal 108 of the system illustrated in FIG. 1.

FIG. 2 illustrates a preferred embodiment of a portion of a terminal 108 of the system of FIG. 1. As shown, each terminal 108 receives the transmitted digital signal from a cable or other transmission medium and demodulates the signal at demodulator 200. The output of demodulator 200 is then input into demodulator support circuitry 202 which comprises logic circuitry such as flip-flops and the like required in demodulation of the received signal The demodulated signal from the demodulation support circuitry 202 is then input into a frame synchronizer 204 which determines whether the respective frames of the received digital data are synchronized with each other. The signal from the frame synchronizer 204 is then input into a decrypting circuit 206 where the received digital data signal may be decrypted in accordance with known signal processing techniques. The decrypted signal from decrypting circuit 206 is then input into a demultiplexer 208 which, in the aforementioned preferred embodiment, separates the digital data stream into a plurality of stereo pairs of digital audio signals. The output of the multiplexer 208 is then input into data recovery circuit 210 which may, for example, separate the above-mentioned title, track and author data from the transmitted digital audio data as described in the aforementioned U.S. patent application Ser. No. 07/618,744. Data recovery circuit 210 may also decode and decompress the transmitted digital data as described in the aforementioned U.S. Pat. No. 4,922,537. The output of the data recovery circuit 210 is then input into an output formatter 212 where the digital data is formatted for subsequent signal processing and display.

A memory 214 is preferably provided for storing bits of data to support the demultiplexing, decrypting and decoding functions occurring in decrypting circuit 206, demultiplexer 208, and data recovery circuit 210, respectively. Preferably, the memory is of a non-volatile type such as an EEPROM or an EEROM memory or may be a volatile RAM memory supported by battery 216, which is preferably a lithium type battery. The purpose of battery 216 is to prevent loss of data stored in memory 214 in the event of a power outage.

The transfer of data between the respective components illustrated in FIG. 2 is controlled by microprocessor 218. Microprocessor 218 is responsive to a clock signal from clock 220 and may, for example, provide clocking signals for moving the received data between the respective blocks. Microprocessor 218 may also process the title, track and author information for display as described in U.S. patent application Ser. No. 07/618,744. Finally, an error mute control circuit 222 is preferably provided in accordance with the invention for providing error mute control as will be described in more detail below with respect to FIGS. 3-5.

Figure 3:
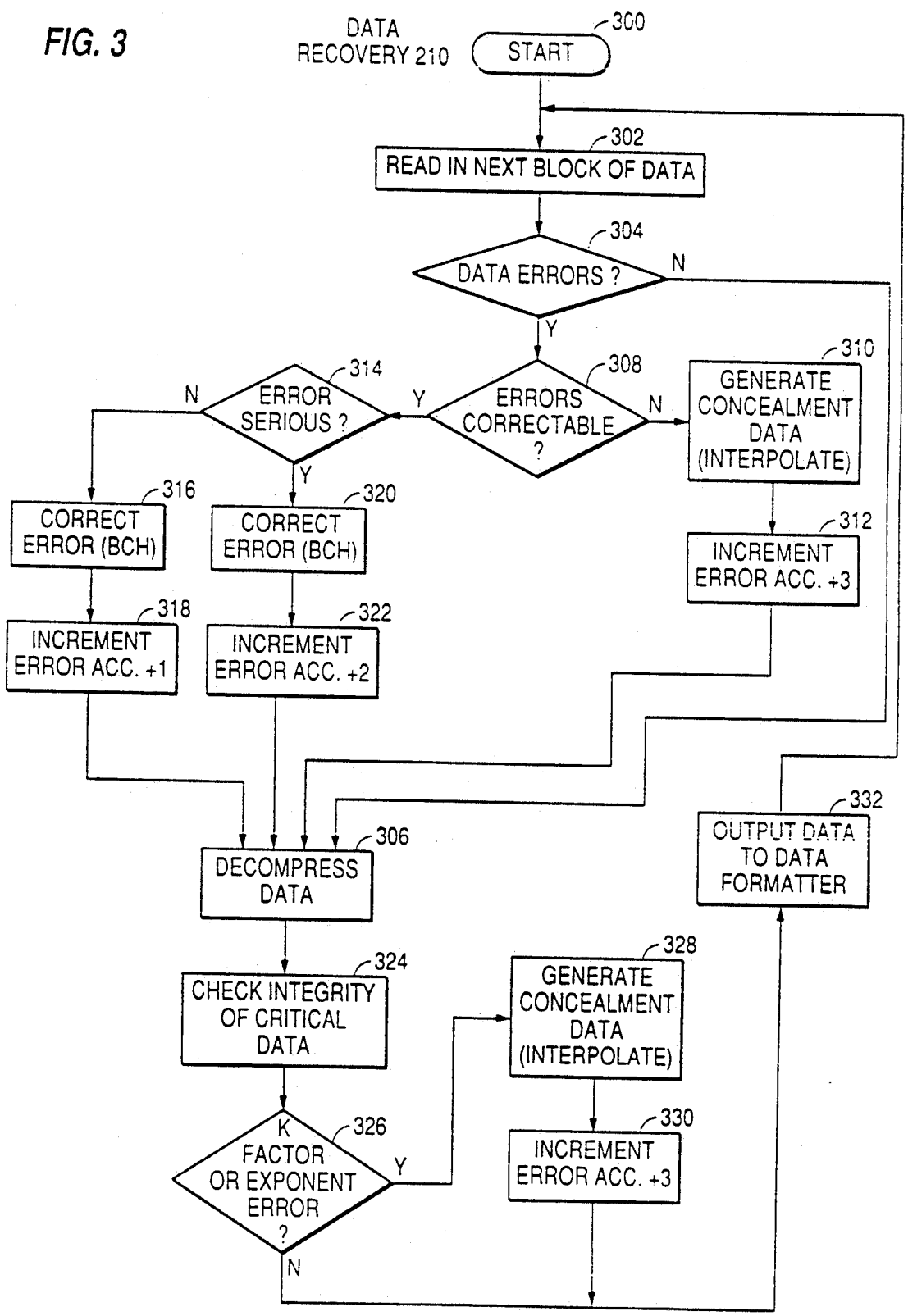
FIG. 3 illustrates a flow chart of a preferred embodiment of the data recovery circuit 210 of the terminal 108 of FIG. 2.

FIG. 3 illustrates a preferred embodiment of data recovery circuit 210. As illustrated, data recovery circuit 210 starts at step 300 and reads in the next block of received digital audio data at block 302. It then determines at step 304 whether the received block of data has any known data transmission errors. If no errors are detected in this data block, control proceeds to step 306, where the received data is decompressed and decoded in accordance with the techniques described, for example, by Frederiksen in U.S. Pat. No. 4,922,537. However, if data errors are detected in the current data block at step 304, data recovery circuit 210 determines at step 308 whether the detected errors are correctable. If the detected errors are not correctable, concealment data is generated at step 310 as by, for example, interpolating between valid data blocks. The error accumulator (to be described below with respect to FIGS. 4 and 5) is then incremented at step 312 by a relatively large value (e.g., +3) to indicate that a major error has occurred. Control then proceeds to step 306, where the data is decompressed and decoded.

However, if it is determined at step 308 that the detected error is correctable, it is determined at step 314 whether the detected error is a serious or a relatively minor error. If the detected error is a relatively minor (single bit) error, the error is corrected at step 316 using, for example, a Bose Chaudhuri Hocquenghen (BCH) error corrector, and the error accumulator is incremented at step 318 by a relatively small value (e.g., +1). The received data is then decompressed and decoded at step 306. On the other hand, if it is determined at step 314 that the detected data contains a relatively serious (two or three bits) error, although one that may be corrected, this error is corrected at step 320 using, for example, a Hamming decoder, a BCH decoder or other error corrector/decoder technique known to those skilled in the art. The error accumulator is then incremented by an intermediate value (e.g., +2) at block 322, and the received data is then decompressed and decoded at step 306. However, those skilled in the art will appreciate that other methods of error detection such as cyclical redundancy code (CRC) checking or parity may be used as alternate or supplemental error detection mechanisms in accordance with the invention.

Those skilled in the art will appreciate that these error detection and correction techniques may be used in conjunction with other known techniques. For example, data in the serial data stream besides the digital audio data (such as the title, track and author information) may be protected by a CRC checker with or without additional error correction. Errors detected by the CRC may or may not generate increment values for the error accumulator as desired.

After the received data block has been decompressed and decoded at step 306, the integrity of critical data is checked at step 324. For example, when the technique described in U.S. Pat. No. 4,922,537 is used for encoding the data, the critical data is the truncated offset value or "K factor" of the data from an average value of respective samples of the data or the exponent data used to represent the compressed data. If is then determined at step 326 whether the critical data contains a parity error, and if so, concealment data is generated at step 328 and the error accumulator is incremented by a relatively large value (e.g., +3) at step 330 to represent this parity error. If no such error is detected, control proceeds directly to step 332, where the processed data is outputted to data formatter 212 for further processing. Control then returns to step 302, where the next block of data is read in.

In accordance with the invention, it is desired that the audio output be muted when the bit error rate in the received digital audio data reaches a level at which error correction and concealment in the terminal 108 can no longer be hidden from the listener. For this purpose, the terminal 108 in accordance with a preferred embodiment of the invention includes error mute controller 222. Preferably, error mute controller 222 mutes the digital audio data output when either a high error rate or loss of frame lock is detected. In other words, the digital audio output is set equal to all zeros and appropriate status bits are set to indicate that the output has been muted.

Figure 4:
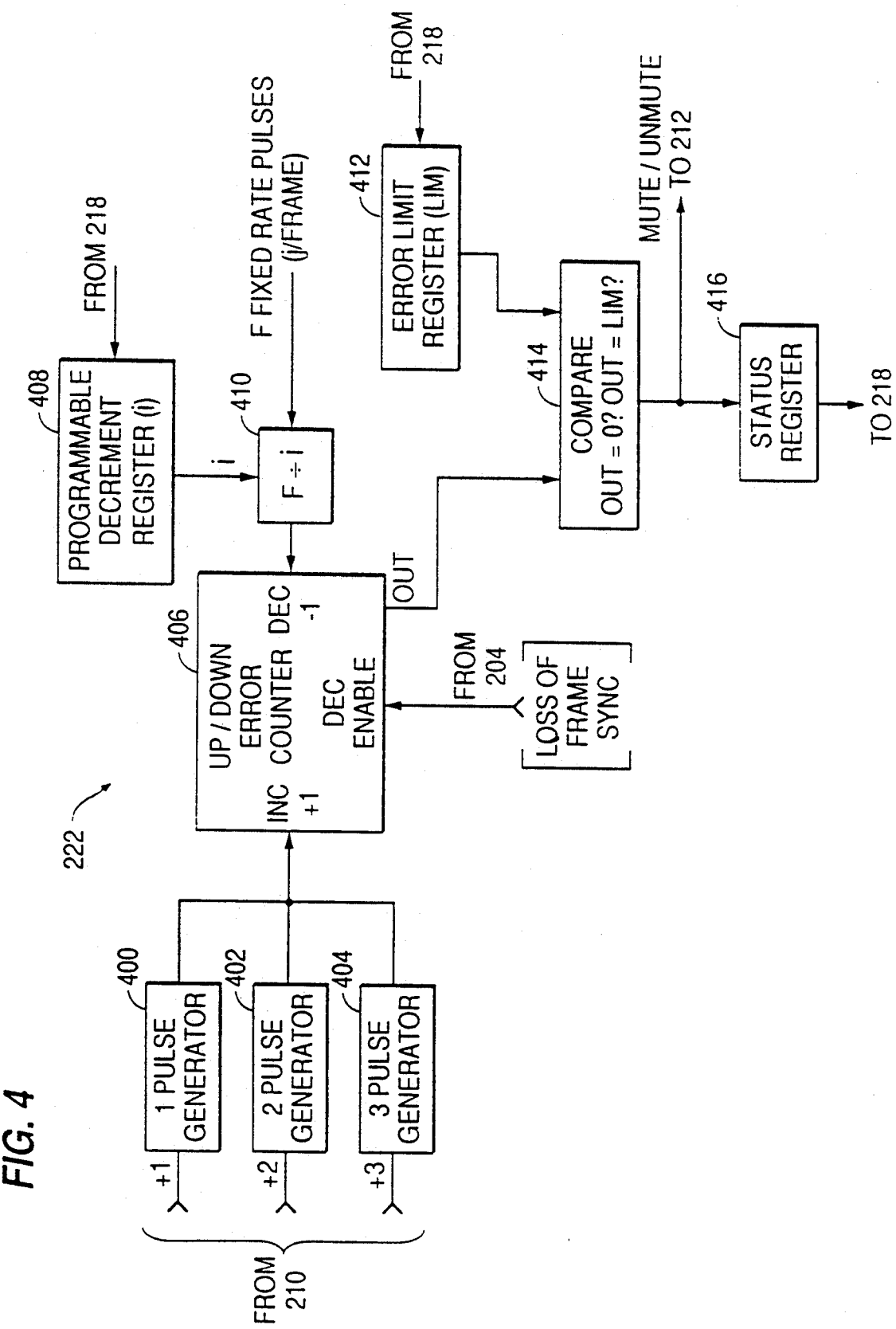
FIG. 4 illustrates a first embodiment of the error mute control circuit 222 of the terminal 108 of FIG. 2.

FIG. 4 illustrates a first embodiment of an error mute controller 222 in accordance with a preferred embodiment of the invention. As illustrated, pulse generators 400, 402 and 404 are provided for respectively providing one pulse, two pulses, or three pulses to an up/down error counter 406 in accordance with whether the detected error in the data transmission was a minor error (one pulse), a relatively serious but correctable error (two pulses) or a major error which could not be corrected (three pulses). Of course, differing degrees or weights may be applied to any of a variety of different errors and a different number of pulses may be generated in accordance with the severity of those errors. The outputs of the pulse generators 400, 402 and 404 thus increment the error counter 406 in accordance with the severity of the received errors.

Up/down error counter 406 also receives pulses in accordance with a programmable error rate at its decrement input for decrementing the error count at predetermined intervals. In this manner, up/down error counter 406 can be made responsive to the error rate of the received signal. In a preferred embodiment, the programmable error rate applied to the decrement input of the up/down error counter 406 is derived by inputting a predetermined value i into a programmable decrement register 408, and this value i is divided in a frequency divider circuit 410 into a signal F having a fixed pulse rate of j pulses/frame. Preferably, the programmable decrement value i is provided by microprocessor 218 while the fixed rate pulse signal F is provided from frame synchronizing circuit 204 and is related to the received data rate. However, those skilled in the art will appreciate that all these values may be supplied from microprocessor 218 or directly by the manufacturer of the terminal 108.

A decrement enable input to up/down error counter 406 may also be made responsive to a signal from frame synchronizing circuit 204. In particular, when a loss of frame sync signal is received from frame synchronizing circuit 204, the decrement input of up/down error counter 406 is preferably disabled until such time as frame synchronization is restored. The increment input is also effectively disabled since data is not received at the terminal 108 when frame synchronization is lost. As a result, the up/down counter is effectively disabled until frame synchronization is restored. However, those skilled in the art may choose to completely disable up/down error counter 406 under these circumstances so that the error count just prior to loss of frame synchronization may be maintained.

In accordance with another advantageous feature of the invention, a programmable error limit value may be supplied from microprocessor 218 and stored in an error limit register 412. This error limit value LIM preferably represents the number of acceptable errors in the time period specified at the decrement input of up/down error counter 406. For example, the limit value LIM may be 256, while a decrement input is applied to the up/down error counter 406 approximately every 10 microseconds. In this example, the error count is decremented by one every 10 microseconds and the output is muted when the error count reaches, for example, 250. The output of the up/down error counter 406 is compared with LIM in comparator 414. If the error count (accumulator sum output) of up/down error counter 406 is greater than or equal to LIM, a mute signal is sent to the output formatter 212. On the other hand, if the output of up/down error counter 406 is equal to zero or some other predetermined lower threshold, then an unmute signal may be sent to output formatter 212 when the output is currently muted. Thus, comparator 414 continuously compares the error count to two thresholds, and the output of output formatter 212 is muted when the higher threshold is reached and unmuted when lower threshold is reached. The output of comparator 414 is preferably stored in status register 416 for reading by microprocessor 218 to determine the status of the muting operation. Preferably, the up/down error counter 406 also has an upper count limit such as 256 which is not exceeded (i.e., no overflow), thereby allowing the up/down error counter 406 to count down to its lower threshold sooner after normal data transmission has been restored.

Figure 5:
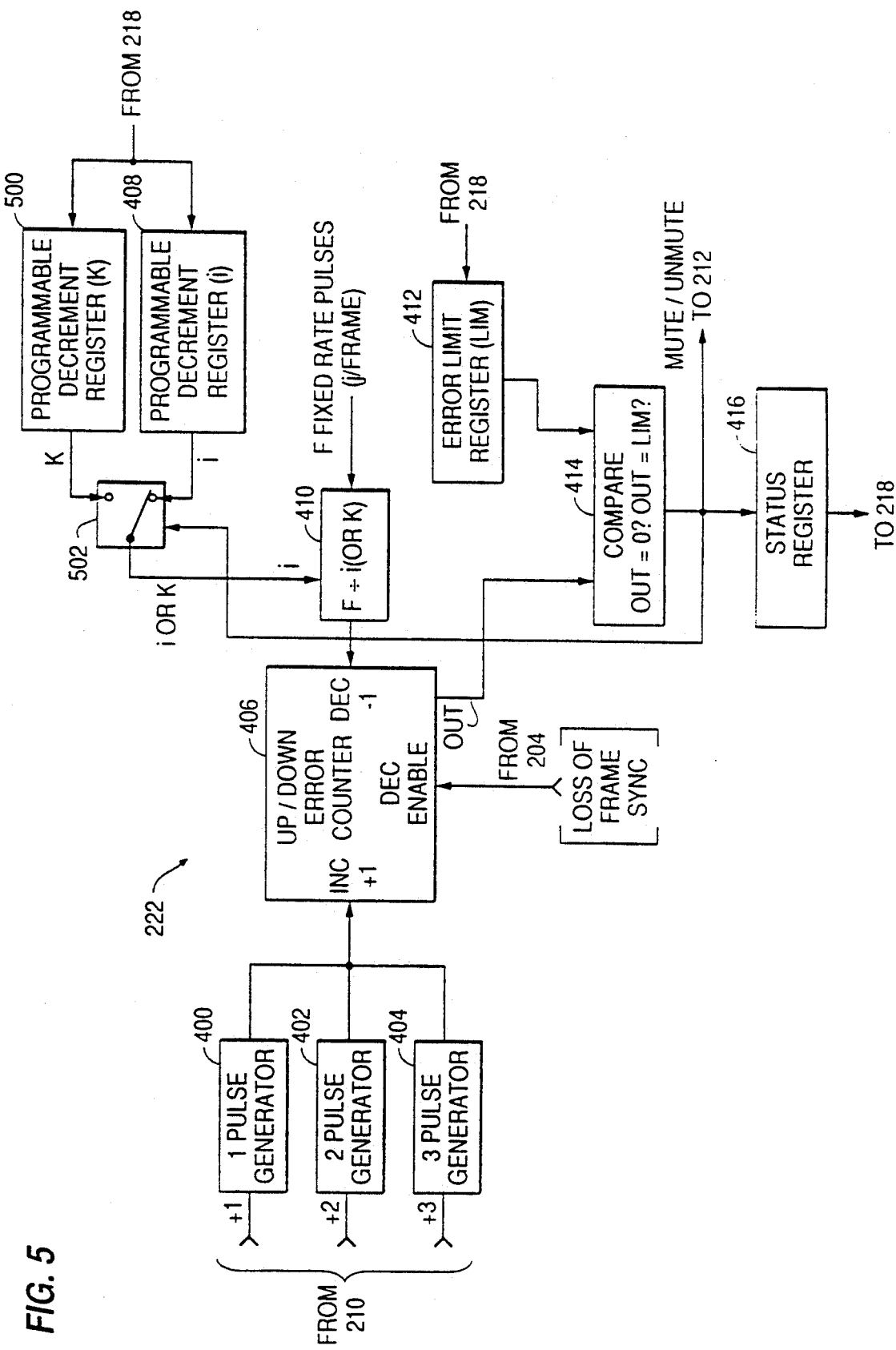
FIG. 5 illustrates a second embodiment of the error mute control circuit 222 of the terminal 108 of FIG. 2.

FIG. 5 illustrates an alternative embodiment of the invention in which the programmable decrement input is changed when the output is muted. For example, a smaller divisor value k may be divided into the pulse sequence F so that pulses are applied at a greater rate to the decrement input of up/down error counter 406, thereby urging the error count back toward the lower limit at a greater rate when the output of output formatter 212 is muted. In other words, when comparator 414 outputs a mute signal, switch 502 is switched from receiving the output i of programmable decrement register 408 to receiving the output k of programmable decrement register 500. This value k is when divided into the fixed rate pulse signal F at divider 410 and the resulting pulse sequence is applied to the decrement input of up/down error counter 406. Of course, the value k may be greater than i so that pulses are applied less frequently to the decrement of up/down error counter 406. Preferably, the decrement rate is determined by system design considerations and hence selectable by the manufacturer of the terminal 108.

Thus, the error rate muting technique of the invention is preferably controlled by an up/down error counter 406, the value LIM stored in error limit register 412 and the error decrement value stored in error decrement register value (i or k). Also, the error rate muting may be controlled by an error increment schedule of the particular transmission system, whereby different types of data errors are given increased weightings so that the error count (accumulator value) in up/down error counter 406 is increased at a greater rate when more significant errors are detected. In a preferred embodiment, up/down error counter 406 contains an 8-bit error counter which is incremented by plus 1, plus 2 or plus 3 in accordance with the schedule set forth below when respective error conditions occur:

| ERROR SCHEDULE: | |
| --- | --- |
| Correctable Single bit BCH error | +1 |
| Correctable two or three bit BCH error | +2 |
| Uncorrectable BCH error | +3 |
| K factor or exponential error | +3 |
| CRC or auxiliary data error | +1 |

The up/down error counter 406 is then decremented by minus one once for every "i" or "k" data block received, where a received data block is such as that described in U.S. Pat. No. 4,922,537. For example, the up/down error counter 406 may be decremented once for every 225 bit ("k") block received for a selected audio station, where "k" is the error decrement value. Such blocks do not necessarily have to be consecutive.

Whenever the error count of up/down error counter 406 equals or exceeds the error limit register value LIM, then the output of output formatter 212 is muted and an "error threshold exceeded" bit is set in status register 416. This may cause an interrupt to be sent to microprocessor 218 if such an interrupt is enabled. The mute condition then must remain and cannot be cleared by the microprocessor 218 until the up/down error counter 406 is decremented to the second and lower limit value, which in a preferred embodiment is zero. When the up/down error counter 406 reaches this value, the "error threshold exceeded" bit in the status register 416 is cleared. This may again cause an interrupt to be sent to microprocessor 218 if such an interrupt is enabled.

In a preferred embodiment, the up/down error counter 406 does not have overflow or under flow, and hence, the up/down error counter 406 holds at both the maximum (for increment) and zero (for decrement) count states. This allows normal muting and unmuting operations to be restored more quickly once normal data transmission is restored.

In a preferred embodiment, in the case of loss of frame lock the mute bit is set and the "frame lock acquired" bit in status register 416 is cleared. This may cause an interrupt in the microprocessor 218 if such an interrupt is enabled. The mute condition must remain and cannot be cleared by the microprocessor 218 until frame synchronization circuit 204 indicates that frame lock has been reacquired. When frame lock is reacquired, the "frame lock acquired" bit in status register 416 is set, which again may cause an interrupt to the microprocessor 218 if such an interrupt is enabled.

In accordance with the invention, frame lock loss and error count muting may be independent conditions.

That is, when frame lock is lost, any count in the up/down error counter 406 is preserved. However, if the up/down error counter 406 is in an "error threshold exceeded" state when frame lock is lost, then the mute bit need not be cleared until the up/down error counter 406 decrements to the lower limit (zero).

In summary, the present invention provides variable thresholds for muting a digital audio output or disabling a receiver output when errors of differing levels of severity are detected. The present invention functions like a leaky integrator with hysteresis by using an error counter with a programmable threshold and an error count which is incremented and decremented at adjustable rates in accordance with a programmable acceptable error rate. The present invention thus prevents intermittent mutes and functions to mute or disable the output only when the error rate is unacceptably high or frame lock is lost.

Although exemplary embodiments of the invention have been described in detail above, those skilled in the art will readily appreciate that many additional modifications are possible in the exemplary embodiments without materially departing from the novel teachings and advantages of the invention. For example, the technique of the invention may be used with conventional techniques such as fading in and fading out of the mute signal when changing channels and muting of the output under listener control. Accordingly, all such modifications are intended to be included within the scope of this invention as defined in the following claims.

We claim:

1. A data transmission system having an error correction system with a programmable error sensitivity, comprising:
   means for generating first values representing different types of data transmission errors of said data transmission system, greater values being assigned to more serious data transmission errors;
   means for generating second values, complementary to said first values, at a programmable rate which is proportional to a maximum acceptable data transmission error rate; and
   means for continuously summing said first and second values and, when the sum of said first and second values exceeds a first predetermined threshold value, disabling an output of said data transmission system until the sum of said first and second values falls below a second predetermined threshold value.

2. A system as in claim 1, wherein said means for generating said second values includes means for changing said programmable rate at which said second values are generated when said output of said data transmission system is disabled.

3. A system as in claim 1, wherein said means for generating said first values comprises respective data error detection circuits for correcting detected data transmission errors of said data transmission system.

4. A system as in claim 1, wherein said second predetermined threshold value is less than said first predetermined threshold value.

5. A system as in claim 4, wherein said second predetermined threshold value is zero.

6. A system as in claim 1, wherein said summing means comprises an up/down counter having an increment input receiving said first values and a decrement input receiving said second values.

7. A system as in claim 6, wherein said up/down counter does not increment above a predetermined upper limit which is at least as great as said first predetermined threshold value and does not decrement below said second predetermined threshold value.

8. A system as in claim 6, wherein said means for generating said second values comprises a frequency divider responsive to a fixed rate pulse stream F and a programmable register for storing a divisor value i, said programmable rate being generated by said frequency divider by dividing said pulse stream F by said divisor value i.

9. A system as in claim 5, wherein said means for generating said second values further comprises an additional programmable register for storing a divisor value k and a switch for applying said divisor value k to said frequency divider for division into said pulse stream F when said output of said data transmission system is disabled, thereby changing the resulting programmable rate so that the sum of said first and second values reaches said second predetermined threshold value at a different rate than when said frequency divider divides said pulse stream F by said divisor value i.

10. A system as in claim 8, wherein said summing means further comprises an error limit register for storing said first predetermined threshold value and a comparator for comparing a sum output of said up/down counter with said first predetermined threshold value from said error limit register and outputting a disable signal when said sum output of said up/down counter exceeds said first predetermined threshold value.

11. A system as in claim 10, wherein said data transmission system transmits data in respective synchronized data frames and said error detection system further comprises a frame synchronous detector for detecting whether said data transmitted by said data transmission system is frame synchronized, said frame synchronous detector disabling said decrement input during time periods in which said data transmitted by said data transmission system has lost its frame synchronization.

12. A digital audio data transmission system comprising an audio transmitter and a plurality of audio receivers, each audio receiver having a muting system for muting its audio output in accordance with a programmable error sensitivity when errors in the received audio signal are detected, said muting system comprising:
means for generating first values representing different types of data transmission errors of said digital audio data transmission system, greater values being assigned to more serious errors in the received audio signal;
means for generating second values, complementary to said first values, at a programmable rate which is proportional to a maximum acceptable data transmission error rate; and
means for continuously summing said first and second values and, when the sum of said first and second values exceeds a first predetermined threshold value, muting an output of said audio receiver until the sum of said first and second values falls below a second predetermined threshold value.

13. A system as in claim 12, wherein said means for generating said second values includes means for changing said programmable rate at which said second values are generated when said output of said audio receiver is muted.

14. A system as in claim 12, wherein said means for generating said first values comprises respective data error detection circuits for correcting detected errors in said received digital audio data.

15. A system as in claim 12, wherein said second predetermined threshold value is less than said first predetermined threshold value.

16. A system as in claim 15, wherein said second predetermined threshold value is zero.

17. A system as in claim 12, wherein said summing means comprises an up/down counter having an increment input receiving said first values and a decrement input receiving said second values.

18. A system as in claim 17, wherein said up/down counter does not increment above a predetermined upper limit which is at least as great as said first predetermined threshold value and does not decrement below said second predetermined threshold value.

19. A system as in claim 17, wherein said means for generating said second values comprises a frequency divider responsive to a fixed rate pulse stream F and a programmable register for storing a divisor value i, said programmable rate being generated by said frequency divider by dividing said pulse stream F by said divisor value i.

20. A system as in claim 19, wherein said means for generating said second values further comprises an additional programmable register for storing a divisor value k and a switch for applying said divisor value k to said frequency divider for division into said pulse stream F when said output of said audio receiver is muted, thereby changing the resulting programmable rate so that the sum of said first and second values reaches said second predetermined threshold value at a different rate than when said frequency divider divides said pulse stream F by said divisor value i.

21. A system as in claim 16, wherein said summing means further comprises an error limit register for storing said first predetermined threshold value and a comparator for comparing a sum output of said up/down counter with said first predetermined threshold value from said error limit register and outputting a disable signal when said sum output of said up/down counter exceeds said first predetermined threshold value.

22. A system as in claim 21, wherein said audio transmitter transmits said audio data in respective synchronized data frames and said muting system further comprises a frame synchronous detector for detecting whether said audio data transmitted by said audio transmitter is frame synchronized, said frame synchronous detector disabling said decrement input during time periods in which said data received by said audio receiver has lost its frame synchronization.

23. A method of selectively disabling a data transmission system in accordance with the number of received errors in the data transmission per unit time, comprising the steps of:
generating first values representing different types of data transmission errors of said data transmission system, greater values being assigned to more serious data transmission errors;
generating second values, complementary to said first values, at a programmable rate which is proportional to a maximum acceptable number of received errors in the data transmission per unit time; and
continuously summing said first and second values and, when the sum of said first and second values exceeds a first predetermined threshold value, disabling an output of said data transmission system until the sum of said first and second values falls below a second predetermined threshold value.

24. A method as in claim 23, comprising the further step of changing said programmable rate at which said second values are generated when said output of said data transmission system is disabled.

25. A method as in claim 23, comprising the further step of setting said second predetermined threshold value at a value less than said first predetermined threshold value.

26. A method as in claim 25, comprising the further step of setting said second predetermined threshold value at zero and said first predetermined threshold value at a value substantially greater than zero.

27. A method as in claim 23, wherein said summing step comprises the steps of incrementing an up/down counter with said first values and decrementing said up/down counter with said second values.

28. A method as in claim 27, comprising the further step of preventing said up/down counter from incrementing above a predetermined upper limit which is at least as great as said first predetermined threshold value and from decrementing below said second predetermined threshold value.

29. A method as in claim 27, wherein said step of generating said second values comprises the step of dividing a fixed rate pulse stream F by a divisor value i to establish said programmable rate.

30. A method as in claim 29, wherein said step of generating said second values comprises the further step of dividing said fixed rate pulse stream F by a divisor value k when said output of said data transmission system is disabled, said divisor value k having a value different than said divisor value i so that the resulting programmable rate is changed when said data transmission system is disabled and the sum of said first and second values reaches said second predetermined threshold value at a different rate than when said fixed rate pulse stream F is divided by said divisor value i.

31. A method as in claim 29, wherein said summing step comprises the steps of comparing a sum output of said up/down counter with said first predetermined threshold value and outputting a disable signal when said sum output of said up/down counter exceeds said first predetermined threshold value.

32. A method as in claim 31, wherein said data transmission system transmits data in respective synchronized data frames, comprising the further steps of detecting whether said data transmitted by said data transmission system is frame synchronized and disabling said decrement input to said up/down counter during time periods in which said data transmitted by said data transmission system has lost its frame synchronization.

33. A method of selectively muting an output of a digital audio receiver of digital audio data transmission system in accordance with the number of received errors in the digital audio data transmission per unit time, comprising the steps of:

generating first values representing different types of data transmission errors of said digital audio data transmission system, greater values being assigned to more serious errors in the received audio signal;

generating second values, complementary to said first values, at a programmable rate which is proportional to a maximum acceptable data transmission error rate; and continuously summing said first and second values and, when the sum of said first and second values exceeds a first predetermined threshold value, muting an output of said audio receiver until the sum of said first and second values falls below a second predetermined threshold value.

34. A method as in claim 33, comprising the further step of changing said programmable rate at which said second values are generated when said output of said audio receiver is muted.

35. A method as in claim 33, comprising the further step of setting said second predetermined threshold value at a value less than said first predetermined threshold value.

36. A method as in claim 35, comprising the further step of setting said second predetermined threshold value at zero and said first predetermined threshold value at a value substantially greater than zero.

37. A method as in claim 33, wherein said summing step comprises the steps of incrementing an up/down counter with said first values and decrementing said up/down counter with said second values.

38. A method as in claim 37, comprising the further step of preventing said up/down counter from incrementing above a predetermined upper limit which is at least as great as said first predetermined threshold value and from decrementing below said second predetermined threshold value.

39. A method as in claim 37, wherein said step of generating said second values comprises the step of dividing a fixed rate pulse stream F by a divisor value i to establish said programmable rate.

40. A method as in claim 39, wherein said step of generating said second values comprises the further step of dividing said fixed rate pulse stream F by a divisor value k when said output of said audio receiver is muted, said divisor value k having a value different than said divisor value i so that the resulting programmable rate is changed when said audio receiver is muted and the sum of said first and second values reaches said second predetermined threshold value at a different rate than when said pulse stream F is divided by said divisor value i.

41. A method as in claim 39, wherein said summing step comprises the steps of comparing a sum output of said up/down counter with said first predetermined threshold value and outputting a muting signal when said sum output of said up/down counter exceeds said first predetermined threshold value.

42. A method as in claim 41, wherein said digital audio transmission system transmits said audio data in respective synchronized data frames, comprising the further steps of detecting whether received digital audio data is frame synchronized and disabling said decrement input to said up/down counter during time periods in which said received digital audio data has lost its frame synchronization.

* * * * *